United States Patent
Mosko et al.

(10) Patent No.: US 10,355,999 B2
(45) Date of Patent: Jul. 16, 2019

(54) FLOW CONTROL WITH NETWORK NAMED FRAGMENTS

(71) Applicant: CISCO TECHNOLOGY, INC., San Jose, CA (US)

(72) Inventors: Marc E. Mosko, Santa Cruz, CA (US); Christopher A. Wood, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 457 days.

(21) Appl. No.: 14/863,307

(22) Filed: Sep. 23, 2015

(65) Prior Publication Data

US 2017/0085491 A1   Mar. 23, 2017

(51) Int. Cl.
 *H04L 12/823*  (2013.01)
 *H04L 12/801*  (2013.01)

(52) U.S. Cl.
 CPC .............. *H04L 47/32* (2013.01); *H04L 47/11* (2013.01); *H04L 47/33* (2013.01)

(58) Field of Classification Search
 None
 See application file for complete search history.

(56) References Cited

U.S. PATENT DOCUMENTS

| | | | |
|---|---|---|---|
| 817,441 A | 4/1906 | Niesz | |
| 4,309,569 A | 1/1982 | Merkle | |
| 4,921,898 A | 5/1990 | Lenney | |
| 5,070,134 A | 12/1991 | Oyamada | |
| 5,110,856 A | 5/1992 | Oyamada | |
| 5,214,702 A | 5/1993 | Fischer | |
| 5,377,354 A | 12/1994 | Scannell | |
| 5,506,844 A | 4/1996 | Rao | |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

(Continued)

Primary Examiner — Hicham B Foud

(57) ABSTRACT

One embodiment provides a system that facilitates efficient and secure flow control based on a fragmentation protocol. During operation, the system receives, by an intermediate node, a first fragment which is a fragment of a content object that is fragmented into a plurality of fragments, wherein the plurality of fragments includes at least one named fragment, which indicates a name associated with the content object, the name being a hierarchically structured variable-length identifier that comprises contiguous name components ordered from a most general level to a most specific level. The intermediate node detects a congestion, and sets an indicator for congestion notification in the received fragment. The intermediate node forwards the received fragment, and drops a second fragment received after the forwarded fragment.

24 Claims, 16 Drawing Sheets

(56) References Cited

U.S. PATENT DOCUMENTS

| | | |
|---|---|---|
| 5,629,370 A | 5/1997 | Freidzon |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,077,606 B1 | 12/2011 | Litwack |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |

(56) References Cited

U.S. PATENT DOCUMENTS

| | | |
|---|---|---|
| 9,270,598 B1 | 2/2016 | Oran |
| 9,280,610 B2 | 3/2016 | Gruber |
| 9,686,194 B2 * | 6/2017 | Jacobson .............. H04L 45/745 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0083929 A1 | 4/2005 | Salo et al. |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |

(56) References Cited

U.S. PATENT DOCUMENTS

| | | |
|---|---|---|
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1* | 8/2010 | Jacobson ............... H04L 45/00 370/392 |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |

(56) References Cited

U.S. PATENT DOCUMENTS

| | | |
|---|---|---|
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |
| 2017/0187641 A1* | 6/2017 | Lundqvist ............ H04L 47/621 |
| 2017/0302681 A1* | 10/2017 | Solis .................... H04L 63/123 |
| 2018/0011936 A1* | 1/2018 | Mosko ............... H04L 67/2842 |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |

(56) References Cited

FOREIGN PATENT DOCUMENTS

| | | |
|---|---|---|
| EP | 2323346 | 5/2011 |
| EP | 2552083 | 1/2013 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2014023072 | 2/2014 |
| WO | 2014/074802 A1 | 5/2014 |
| WO | 2014/108773 A1 | 7/2014 |
| WO | 2015084327 | 6/2015 |

OTHER PUBLICATIONS

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content-Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.
Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1, 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
"PBC Library—Pairing-Based Cryptography—About," http://crypto.stanford.edu/pbc. downloaded Apr. 27, 2015.
C. Gentry and A. Silverberg. Hierarchical ID-Based Cryptography. Advances in Cryptology—ASIACRYPT 2002. Springer Berlin Heidelberg (2002).
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Lotspiech, S. Nusser, and F. Pestoni. Anonymous Trust: Digit.
J. Shao and Z. Cao. CCA-Secure Proxy Re-Encryption without Pairings. Public Key Cryptography. Springer Lecture Notes in Computer Sciencevol. 5443 (2009).
Gopal et al. "Integrating content-based Mechanisms with hierarchical File systems", Feb. 1999, University of Arizona, 15 pages.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
RTMP (2009). Available online at http://wwwimages.adobe.com/www.adobe.com/content/dam/Adobe/en/devnet/rtmp/ pdf/rtmp specification 1.0.pdf.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).

(56) References Cited

OTHER PUBLICATIONS

S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: An architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and counter-measures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.

(56) References Cited

OTHER PUBLICATIONS

Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision—Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: an OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. H Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

(56) References Cited

OTHER PUBLICATIONS

Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, Parc Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Extended European Search Report in counterpart European Application No. 16187859.0, dated Feb. 7, 2017, 10 pages.

\* cited by examiner

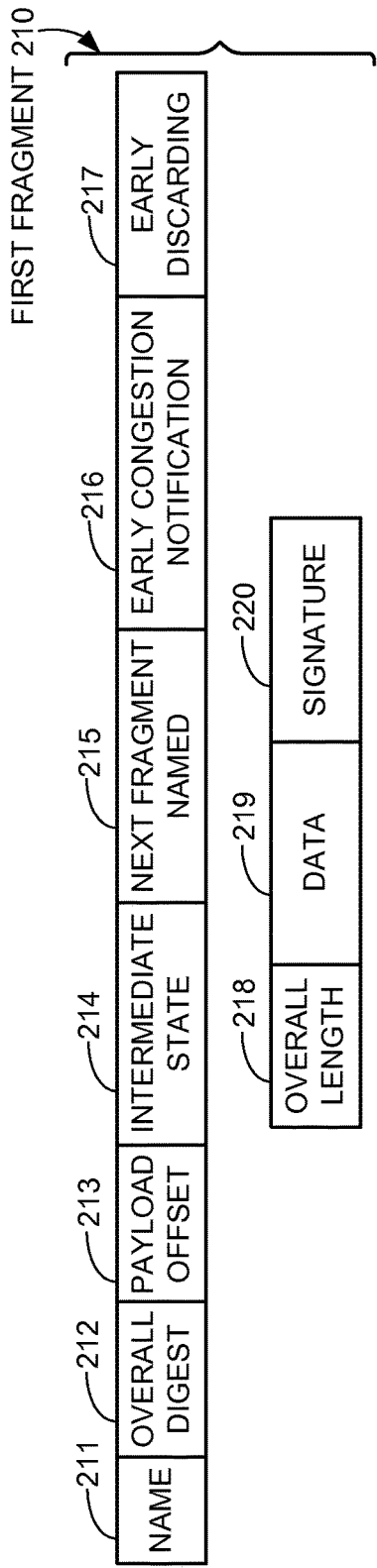
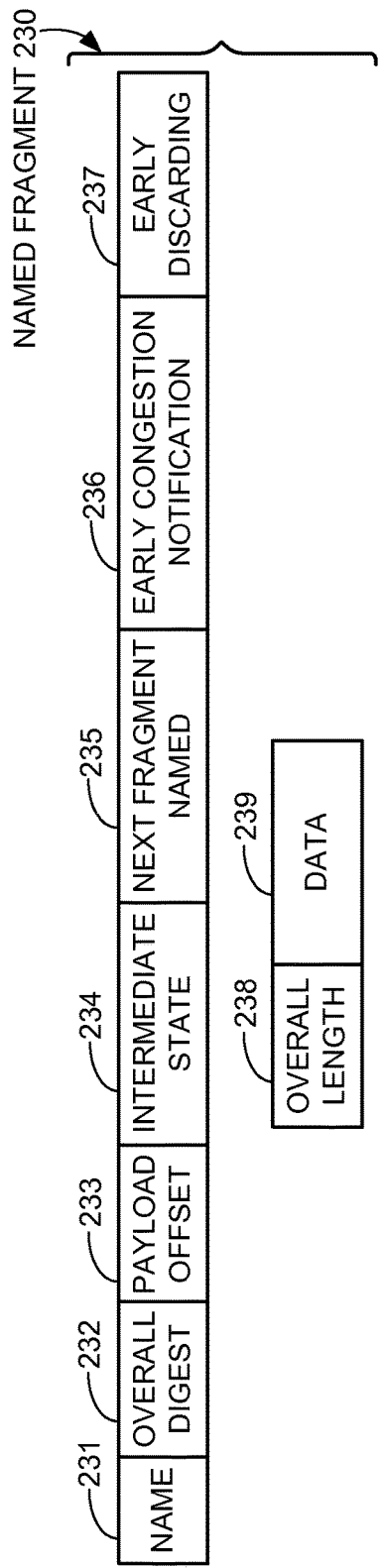
FIG. 2A
FIG. 2B

FLOW CONTROL WITH NETWORK NAMED FRAGMENTS

RELATED APPLICATION

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. Pat. No. 8,386,622, entitled "METHOD AND APPARATUS FOR FACILITATING COMMUNICATION IN A CONTENT CENTRIC NETWORK," by inventor Van Jacobson, filed 11 Dec. 2008 (hereinafter "U.S. Pat. No. 8,386,622");

U.S. Pat. No. 8,204,060, entitled "METHOD AND SYSTEM FOR FACILITATING FORWARDING A PACKET IN A CONTENT-CENTRIC NETWORK," by inventor Van L. Jacobson and James D. Thornton, filed 17 Dec. 2009 (hereinafter "U.S. Pat. No. 8,204,060");

U.S. patent application Ser. No. 14/065,691, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 29 Oct. 2013 (hereinafter "U.S. patent application Ser. No. 14/065,691"); and U.S. patent application Ser. No. 14/851,894, entitled "NETWORK NAMED FRAGMENTS IN A CONTENT CENTRIC NETWORK," by inventors Marc E. Mosko and Christopher A. Wood, filed 11 Sep. 2015 (hereinafter "U.S. patent application Ser. No. 14/851,894");

the disclosures of which are herein incorporated by reference in their entirety.

BACKGROUND

Field

This disclosure is generally related to distribution of digital content. More specifically, this disclosure is related to a system and method for flow control based on a secure fragmentation protocol in a content centric network.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. Generally, interests and content objects travel through a number of links before they can reach their destination. Each link can have its own maximum transmission unit (MTU), where the differing MTU limits impose different fragmentation requirements.

Fragmentation protocols related to CCN continue to evolve. One secure fragmentation protocol for CCN is known as Fragmentation with Integrity Guarantees and Optional Authentication (FIGOA), described in Ghali et al., "Secure Fragmentation for Content-Centric Networks," *Computing Research Repository*, 1405.2861 (2014), which disclosure is herein incorporated by reference in its entirety. The FIGOA protocol operates by creating fragments that are chained via hash computation, transmitting fragments with a name that match an interest for the name, and including a signature in the final fragment. However, under the FIGOA protocol, a content producer signs the final fragment, which creates a delayed verification of the signature by a requesting entity until all fragments have been received. This delayed verification may decrease the overall throughput of data and may also result in the injection of malicious packets, which can create inefficiencies and introduce security issues in the network. In addition, the FIGOA protocol does not provide a method to selectively request re-transmission of a specific fragment or subsequence of fragments. When a fragment is dropped, an intermediate node has no way to mark the point at which it drops a fragment stream. A requesting entity re-requests the entire data stream, resulting in further inefficiencies in the network.

SUMMARY

One embodiment provides a system that facilitates efficient and secure flow control based on a fragmentation protocol. During operation, the system receives, by an intermediate node, a first fragment which is a fragment of a content object that is fragmented into a plurality of fragments, wherein the plurality of fragments includes at least one named fragment, which indicates a name associated with the content object, the name being a hierarchically structured variable-length identifier that comprises contiguous name components ordered from a most general level to a most specific level. The intermediate node detects a congestion and sets an indicator for congestion notification in the received fragment. The intermediate node forwards the received fragment and drops a second fragment received after the forwarded fragment.

In a variation on this embodiment, in response to detecting the congestion, the intermediate node determines that the received fragment indicates an optimal position to restart a flow of the fragment, wherein the indicator for congestion notification is an indicator for early congestion notification.

In a further variation, the intermediate node determines that the received fragment indicates an optimal position to restart a flow of the fragment. The intermediate node also determines that the received fragment is a previous fragment that directly precedes a named fragment.

In a further variation, the intermediate node determines that the received fragment does not indicate an optimal position to restart a flow of the fragment, wherein the indicator for congestion notification is an indicator for early discarding.

In a further variation, the intermediate node receives a third fragment with the indicator for early congestion notification. The intermediate node identifies an alternate path not associated with the congestion, and generates an interest for a remainder of the plurality of fragments starting from a next fragment that directly follows the third fragment. The intermediate node resets the indicator for early congestion notification, and forwards the interest based on an interface associated with the alternate path.

In a further variation, the intermediate node computes an intermediate state for the next fragment based on a hash function performed on an intermediate state from the received fragment, wherein the received fragment indicates an intermediate state which is based on a hash function performed on an intermediate state from a previous fragment and data included in the received fragment. The intermediate node determines a payload size for the remainder of the plurality of fragments starting from the next fragment, and includes in a name for the interest the computed intermediate state and the determined payload size.

In a further variation, the intermediate node receives a third fragment with the indicator for early discarding. The intermediate node identifies an alternate path not associated with the congestion, and further identifies a previously received named fragment that is closest in order to the received fragment. The intermediate node generates an interest for a remainder of the plurality of fragments starting from the previously received named fragment. The intermediate node resets the indicator for early discarding and forwards the interest based on an interface associated with the alternate path.

In a further variation, the intermediate node determines a payload size for the remainder of the plurality of fragments starting from the previously received named fragment. The intermediate node includes in a name for the interest message an intermediate state for the previously received named fragment and the determined payload size, wherein the intermediate state for the previously received named fragment is based on a hash function performed on an intermediate state from a previous fragment that directly precedes the previously named fragment and data included in the previously received named fragment.

In a further variation, a name for an interest includes a digest for the content object, and a number indicating a byte offset that corresponds to a starting byte for the received fragment or a previously received named fragment closest in order to the received fragment.

In another embodiment, the system receives, by a content requesting device, a first fragment which is a fragment of a content object message that is fragmented into a plurality of fragments, wherein the plurality of fragments includes at least one named fragment, which indicates a name associated with the content object, the name being a hierarchically structured variable-length identifier that comprises contiguous name components ordered from a most general level to a most specific level. The content requesting device determines that an indicator for congestion notification in the received fragment is set, and generates an interest for a remainder of the plurality of fragments starting from a named fragment.

In a variation on this embodiment, the indicator for congestion notification is an indicator for early congestion notification, and the named fragment is a next fragment that directly follows the received fragment. The content requesting device computes an intermediate state for the next fragment based on a hash function performed on an intermediate state from the received fragment, wherein the received fragment indicates an intermediate state which is based on a hash function performed on an intermediate state from a previous fragment and data included in the received fragment. The content requesting device determines a payload size for the remainder of the plurality of fragments starting from the next fragment, and includes in a name for the interest the computed intermediate state and the determined payload size.

In a further variation, the content requesting device updates a corresponding entry in a pending interest table based on a payload offset of the received fragment, wherein the payload offset is a number indicating a byte offset that corresponds to a starting byte for the received fragment.

In a further variation, the indicator for congestion notification is an indicator for early discarding, and the named fragment is a previously received named fragment that is closest in order to the received fragment. The content requesting device determines a payload size for the remainder of the plurality of fragments starting from the previously received named fragment, and includes in a name for the interest an intermediate state for the previously received named fragment and the determined payload size, wherein the intermediate state for the previously received named fragment is based on a hash function performed on an intermediate state from a previous fragment that directly precedes the previously named fragment and data included in the previously received named fragment.

In a further variation, the content requesting device updates a corresponding entry in a pending interest table based on a payload offset of the previously received named fragment, wherein the payload offset is a number indicating a byte offset that corresponds to a starting byte for the previously received named fragment.

In a further variation, in response to determining that the indicator for congestion notification in the received fragment is not set, the content requesting device processes the received fragment for reassembly.

BRIEF DESCRIPTION OF THE FIGURES

FIG. 2A illustrates an exemplary format for a first fragment of a content object message, in accordance with an embodiment of the present invention.

FIG. 2B illustrates an exemplary format for a named fragment of a content object message, in accordance with an embodiment of the present invention.

In the figures, like reference numerals refer to the same figure elements.

DETAILED DESCRIPTION

Figure 1:
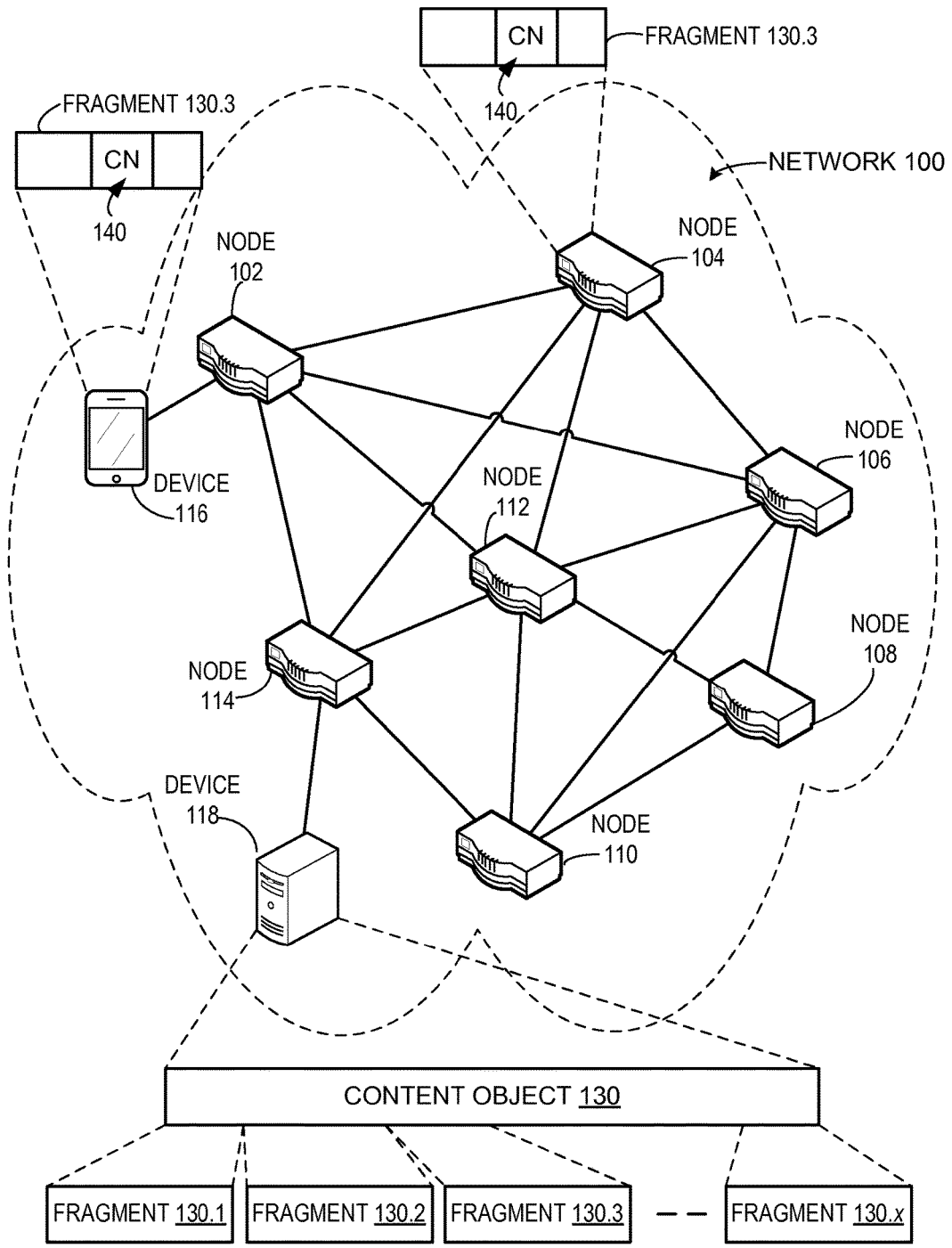
FIG. 1 illustrates an exemplary network facilitating flow control based on a secure fragmentation protocol, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that solves the problem of re-requesting an entire fragment stream when only one fragment is dropped by allowing an intermediate node to mark the dropping point and by providing a secure fragmentation protocol where one or more fragments carry a network addressable name (i.e., a named fragment). An intermediate node may detect congestion and drop a fragment at any point. The marked dropping point and the unique name allow a content requestor to re-request only a subsequence of the fragment stream, rather than the entire fragment stream. As a result, the flow of the congested dropped stream is more efficiently resumed. The intermediate node can be a part of a content centric network (CCN), where communication is based on a secure fragmentation protocol known as the Network Named Fragments protocol.

The intermediate node can indicate a detected congestion by marking a flag carried in a fragment. The flag indicates the point at which the intermediate node drops the fragment stream. This allows the requestor to generate an interest for only the remainder of the fragments. For example, the intermediate node can set an early congestion notification (ECN) flag. The ECN flag indicates that the next fragment is a named fragment and that the requestor should request the stream starting from that next named fragment onwards. In another example, the intermediate node can set an early discarding (ED) flag. The ED flag indicates that the next fragment is not a named fragment and that the requestor should request the stream starting from a previously received named fragment that is closest to the received fragment.

The NNF protocol provides a naming convention that allows a requestor to request the remainder of a fragment stream, i.e., a subsequence of fragments. Each fragment is uniquely identified based on certain state characteristics, such as overall digest, payload offset, payload size, and intermediate state. These state characteristics can be encoded into the name of the fragment to allow selective retransmission of a subsequence of fragments. A requestor can compute the intermediate state of the next fragment because the fragments are hash chained, i.e., each fragment contains an intermediate state which is based on a hash of the data of the respective fragment and the intermediate state from the previous fragment. The already received fragments include sufficient information to compute a remaining payload size, such as the overall length, remaining length, and payload offset. The requestor or an intermediate node can encode this computed information in an interest name to selectively request a subsequence of fragments, thus obviating the need to re-request the entire stream.

In addition, upon receiving a fragment that indicates congestion, an upstream intermediate node can identify an alternate non-congested path and proactively begin requesting the remainder of the fragment stream on behalf of the content requestor. Such an upstream intermediate node also clears the appropriate flag in the received fragment.

The following terms describe elements of a CCN architecture:

Content Object or "content object": A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest or "interest": A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Communication

FIG. 1 illustrates an exemplary network 100 facilitating flow control based on a secure fragmentation protocol, in accordance with an embodiment of the present invention. Network 100 can be a content centric network (CCN) and can include a client device or content requesting device 116, a content producing device 118, and a router or other forwarding device at nodes 102, 104, 106, 108, 110, 112, and 114. A CCN router can be a CCN forwarding device residing on top of an IP router. In other words, CCN can be implemented as an overlay on top of IP. Other CCN overlay architecture is also possible. A node can be a computer system, an end-point representing users, and/or a device that can generate interests or originate content.

A requesting entity (such as device 116) can generate an interest in a piece of content. Intermediate nodes (such as CCN routers 102, 104, 112, and 114) can receive and forward the interest. A content producer (such as device or content producer 118) can satisfy the requested interest. Producer 118 can fragment a responsive content object 130 into x number of fragments, e.g., fragments 130.1-130.x. Producer 118 can sign the first fragment and create a trusted hash chain of the remaining fragments. Producer 118 can immediately begin forwarding fragments 130.1-130.x, which fragments will travel the reverse path as the interest (e.g., to nodes 114, 112, 104, and 102) and reach device 116. An exemplary content object fragmented by a producer is described below in relation to FIGS. 3A and 3C.

During the forwarding of the fragment stream, an intermediate router (such as node 104) can receive a fragment (e.g., fragment 130.3) and detect congestion. Intermediate node 104 can set an indicator of congestion notification (CN) 140 in fragment 130.3, and drop any fragments received after fragment 130.3, as described below in relation to FIG. 4. Device 116 can receive fragment 130.3 and, based on CN indicator 140, determine that the fragment stream has been dropped by an intermediate node. Using the naming convention of the NNF protocol, device 116 can generate an interest for the remainder of the fragment stream that comprises content object 130. This obviates the need for the requesting entity to re-request the entire fragment stream. Instead, the requesting entity can re-request only the specific portion of the stream based on CN indicator 140. In some embodiments, the CN indicator can be one of two flags: an early congestion notification (ECN) flag or an early discarding (ED) flag, as described below in relation to FIGS. 6A and 6B. The flags indicate the point at which the requesting entity should begin re-requesting the fragment stream. Device 116 can receive content object fragments 130.1-130.x and reassemble content object 130.

Exemplary Format of CCN Content Object Message Fragments

FIG. 2A illustrates an exemplary format for a first fragment 210 of a content object message, in accordance with an embodiment of the present invention. First fragment 210 can include the following fields: a name 211 that can indicate the name of the content object and also contain encoded information to specifically identify the fragment; an overall digest 212 that is the digest of the entire fragmented payload for the CCN content object message; a payload offset 213 that is the byte offset where this fragment begins; an intermediate state 214 that is a value calculated based on the initialization vector and the payload or data associated with this fragment (e.g., data 219); a next fragment named (NFN) flag 215 that indicates whether the next fragment that immediately follows this fragment is a fragment that includes a name (e.g., a named fragment); an early congestion notification (ECN) flag 216 that indicates whether an intermediate node has detected congestion and dropped the stream immediately after this fragment, where the next fragment is a named fragment; an early discarding (ED) flag 217 that indicates whether an intermediate node has detected congestion and dropped the stream immediate after this fragment, where the next fragment is not a named fragment; an overall length 218 that is the total length of the entire fragmented payload; a data 219 that is the payload of this fragment and one of the input fields for the hash function to calculate intermediate state 214; and a signature 220 that is the signature of the producer of the content object message. First fragment 210 cannot be re-fragmented by an intermediate node. Thus, first fragment 210 may contain no payload (e.g., no data 219) or a payload with a size smaller than a known MTU of the network.

In some embodiments, NFN flag 215, ECN flag 216, and ED flag 217 are control flags or bits that comprise CN indicator 140 depicted in FIG. 1. These control flags can be carried outside of the fragmented payload so that they do not influence the computation of the hash of the intermediate state. In addition, the control flags do not need to be secured because attacks on these control signals, similar to malicious or accidental drops, result in the content requestor going through its normal timeout and restart procedures that are in place even without the features described herein.

FIG. 2B illustrates an exemplary format for a named fragment 220 of a content object message, in accordance with an embodiment of the present invention. Named fragment 220 is a fragment that is not the first fragment of a stream, and includes a name that indicates the name of the content object and can also contain encoded information to specifically identify the fragment. Named fragment 220 can include similar fields as first fragment 210 of FIG. 2A. For example, named fragment 220 can include the following fields: a name 231; an overall digest 232; a payload offset 233; an intermediate state 234; a next fragment named (NFN) flag 235; an early congestion notification (ECN) flag 236; an early discarding (ED) flag 237; an overall length 238; and a data 239. Intermediate state 234 is calculated based on a hash function performed on the intermediate state of the previous fragment. Overall length 238 is the length of the remaining fragment stream, in contrast with overall length 218 (of first fragment 210 in FIG. 2A) which indicates the overall length of the entire fragmented payload. Overall digests 212 and 222 can be included in first fragment 210 and named fragment 230, respectively, when the hash chain and the final overall digest is known in advance, e.g., when fragmenting a known file. Note that signature 220 is only included in first fragment 210, and not in named fragment 230 (or any other subsequent fragments, named or unnamed).

A subsequent fragment that is neither a first fragment nor a named fragment (e.g., an unnamed fragment) includes similar fields as named fragment 230, but does not include an overall length field, and may not include a name field when CCNx Nameless Objects are supported (as described in U.S. patent application Ser. No. 14/337,026). An unnamed fragment that is a previous fragment that directly precedes a named fragment includes the NFN flag set by the content producer (e.g., set to a value of "1" or another active value). An unnamed fragment that is a previous fragment that does not directly precede a named fragment includes the NFN not set by the content producer (e.g., set to a value of "0" or another inactive value).

Figure 3A:
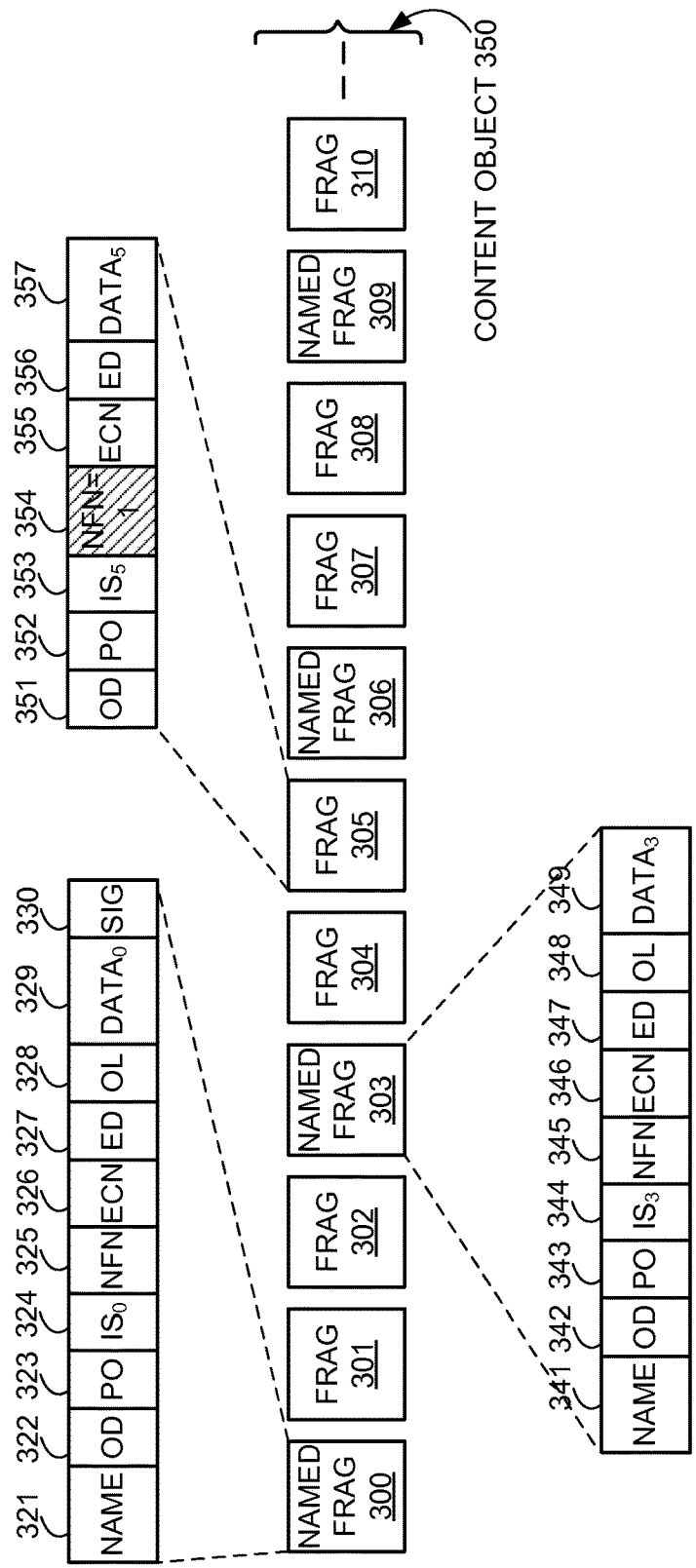
FIG. 3A illustrates a fragmented content object, including an unnamed fragment that is a previous fragment that directly precedes a named fragment, in accordance with an embodiment of the present invention.

FIG. 3A illustrates a fragmented content object 350, including an unnamed fragment 305 that is a previous fragment that directly precedes a named fragment 306, in accordance with an embodiment of the present invention. Content object 350 includes fragments 300-310: a first fragment which is a named fragment 300; named fragments 303, 306, and 309; and unnamed fragments 301, 302, 304, 305, 307, 308, and 310. Named (first) fragment 300 includes similar fields as first fragment 210 of FIG. 2A, and named fragments 303, 306, and 309 include similar fields as named fragment 230 of FIG. 2B. Unnamed fragments 301, 302, 304, 305, 307, 308, and 310 also include similar fields as named fragment 230 of FIG. 2B, with the exception described above (e.g., no name or overall length fields). For example, fragment 305 is an unnamed fragment that directly precedes a named fragment. Thus, the NFN flag for fragment 305 is set to "1" by the content producer, indicating that the next fragment is a named fragment. FIG. 3A depicts the content object message generated by the content producer and as received by an intermediate node.

Figure 3B:
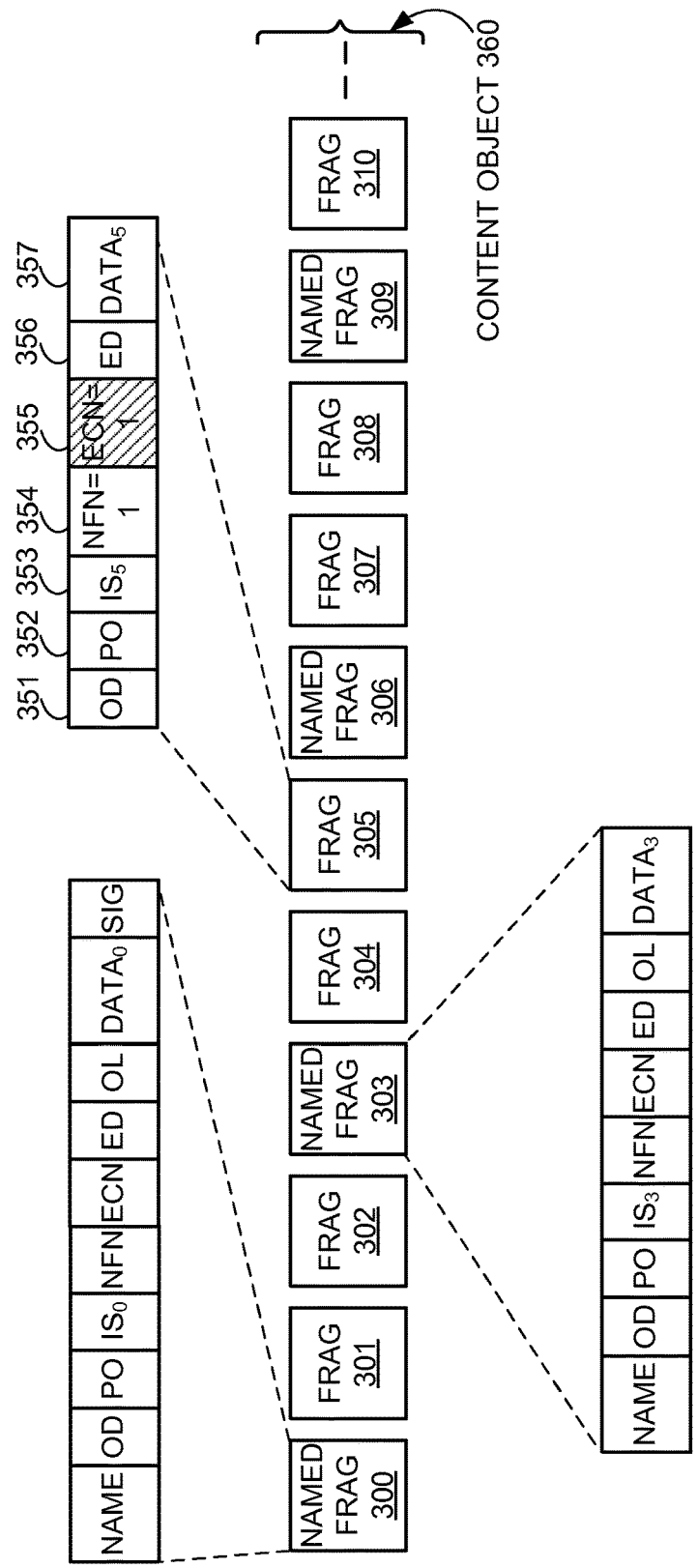
FIG. 3B illustrates a fragmented content object that corresponds to the fragmented content object in FIG. 3A, including an indicator of early congestion notification that is set to an active value, in accordance with an embodiment of the present invention.

FIG. 3B illustrates fragmented content object 360 that corresponds to fragmented content object 350 in FIG. 3A, including an indicator of early congestion notification that is set to an active value, in accordance with an embodiment of the present invention. As in FIG. 3A, NFN field 354 of unnamed fragment 305 is set to an active value. An intermediate node can receive fragment 305 and detect congestion. The intermediate node can subsequently set ECN flag 355 to an active value (e.g., to a value of "1"), indicating to a content requestor that it will drop all fragments occurring after the current fragment. The ECN flag (e.g., ECN flag 355) also indicates to the requestor that the next fragment is a named fragment (e.g., named fragment 306), thus providing sufficient information for the requestor to generate an interest for the remainder of the fragments (e.g., fragments 306-310), as described below in relation to FIGS. 6A and 6B.

Figure 3C:
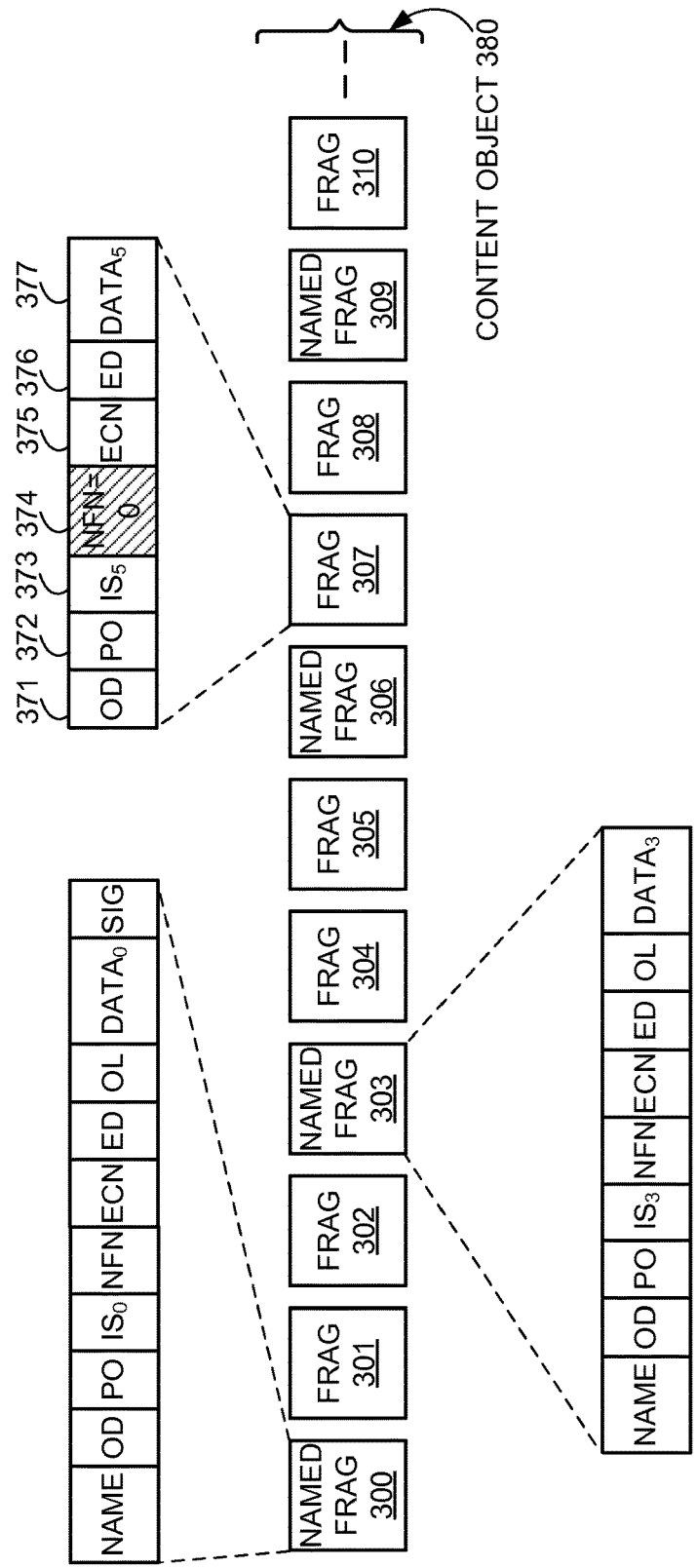
FIG. 3C illustrates a fragmented content object, including an unnamed fragment that is not a previous fragment that directly precedes a named fragment, in accordance with an embodiment of the present invention.

FIG. 3C illustrates a fragmented content object 380, including an unnamed fragment 307 that is not a previous fragment that directly precedes a named fragment, in accordance with an embodiment of the present invention. Content object 380 has similar fragments and fields as content object 350. Content object 380 also includes unnamed fragment 307, which does not directly precede a named fragment. The NFN flag 374 for fragment 307 is not set to an active value (e.g., is set to a value of "0"), indicating that the next fragment is not a named fragment.

Figure 3D:
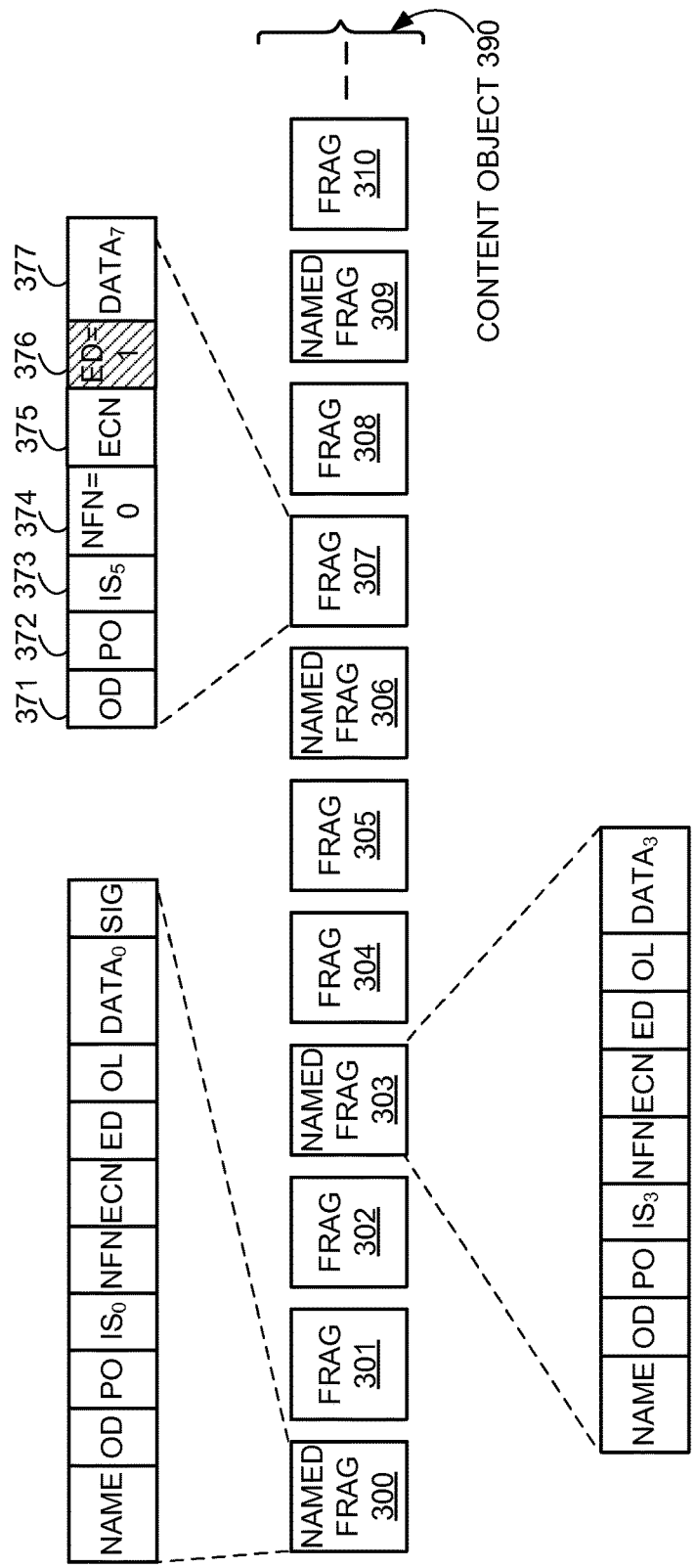
FIG. 3D illustrates a fragmented content object that corresponds to the fragmented content object in FIG. 3C, including an indicator of early discarding that is set to an active value, in accordance with an embodiment of the present invention.

FIG. 3D illustrates a fragmented content object 390 that corresponds to fragmented content object 380 in FIG. 3C, including an indicator of early discarding that is set to an active value, in accordance with an embodiment of the present invention. As in FIG. 3C, NFN field 354 of unnamed fragment 307 is not set to an active value. An intermediate node can receive fragment 307 and detect congestion. The intermediate node can subsequently set ED flag 376 to an active value (e.g., to a value of "1"), indicating to a content requestor that it will drop all fragments occurring after the current fragment. The ED flag (e.g., ED flag 376) also indicates to the requestor that the next fragment is a not a named fragment (e.g., unnamed fragment 308). The ED flag thus provides sufficient information for the requestor to generate an interest for the remainder of the fragments starting from a previously received named fragment that is closest in order to the current fragment (e.g., starting from the closest previously received named fragment 306), as described below in relation to FIGS. 6A and 6B.

Selective Retransmission of a Fragment or a Subsequence of Fragments

Because the NNF protocol uniquely identifies each fragment based on, e.g., {Name, OverallDigest, PayloadOffset, IntermediateState}, certain of these characteristics can be encoded into the name to uniquely address a fragment for selective retransmission. For example, Overall Digest ("OD"), Payload Offset ("PO"), and IntermediateState ("IS") can be encoded in the name for a fragment:

/parc.com/movie.alto.mkv/OD=123abc/PO=4096/
   IS=653efa   (1)

By using this naming convention, a requesting entity (such as a content requesting device or an intermediate node) can selectively request a specific fragment.

In addition, a requesting entity can selectively request a subsequence or chain of fragments by including the name and an additional payload size. For example, consider an interest with the following name:

/parc.com/movie.alto.mkv/OD=123abc/PO=4096/
   IS=653efa/PS=8192   (2)

If the size of each individual fragment is 1024 B, interest (2) returns a chain of four fragments starting at byte offset 4096. Re-fragmentation can also occur. For example, consider an interest with the following name:

/parc.com/movie.alto.mkv/OD=123abc/PO=4096/
   IS=653efa/PS=7680   (3)

Similar to interest (2), interest (3) returns a chain of four fragments. However, the fourth fragment of the chain is re-fragmented to 512 B.

In some embodiments, the interest can carry a TLV field for how many bytes (or blocks or demarcations) to deliver (e.g., the size of the remainder of the plurality of fragments or a specific subsequence of fragments). An intermediate node can truncate the fragment stream at the point indicated in the interest, which allows a requesting entity to limit the congestion created by any single interest.

Processing and Flow Control by an Intermediate Node

Figure 4:
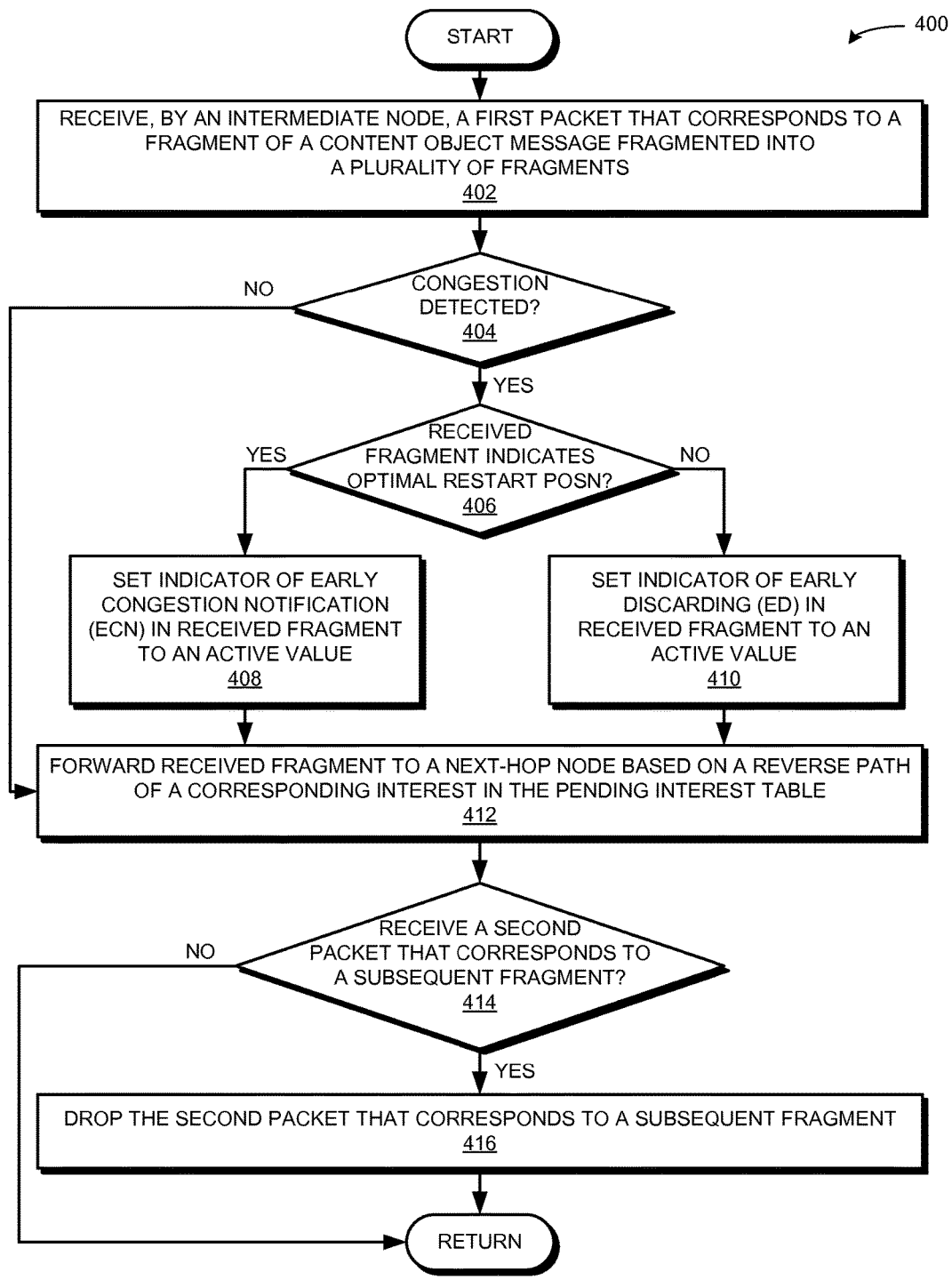
FIG. 4 presents a flow chart illustrating a method by an intermediate node for processing a fragment of a content object message when congestion is detected, in accordance with an embodiment of the present invention.

FIG. 4 presents a flow chart 400 illustrating a method by an intermediate node for processing a fragment of a content object message when congestion is detected, in accordance with an embodiment of the present invention. During operation, an intermediate node receives a first packet that corresponds to a fragment of a content object message fragmented into a plurality of fragments (operation 402). The plurality of fragments includes at least one named fragment, which indicates a name associated with the content object message, where the name is a hierarchically structured variable-length identifier that comprises contiguous name components ordered from a most general level to a most specific level. The intermediate node determines whether congestion is detected (decision 404). If not, the intermediate node forwards the received fragment to a next-hop node based on a reverse path of a corresponding interest in the pending interest table (PIT) (operation 412). If the intermediate node does detect congestion, the intermediate node determines whether the received fragment indicates an optimal restart position (operation 406). The indication of an optimal restart position can be a next named fragment (NFN) flag, such as NFN flags 354 or 374 of FIGS. 3A and 3C, respectively. If the received fragment indicates an optimal restart position, the intermediate node sets an indicator of early congestion notification (ECN) for the received fragment to an active value (operation 408). If the received fragment does not indicate an optimal restart position, the intermediate node sets an indicator of early discarding (ED) for the received fragment to an active value (operation 410). The intermediate node then forwards the received fragment to a next-hop node based on a reverse path of a corresponding interest in the PIT (operation 412).

Subsequently, the intermediate node determines whether it receives a second packet that corresponds to a subsequent fragment, e.g., a fragment received after the forwarded packet (decision 414). If it does not, the operation returns. If the intermediate node does receive a subsequent fragment, the intermediate node drops the subsequent fragment (operation 416).

Figure 5A:
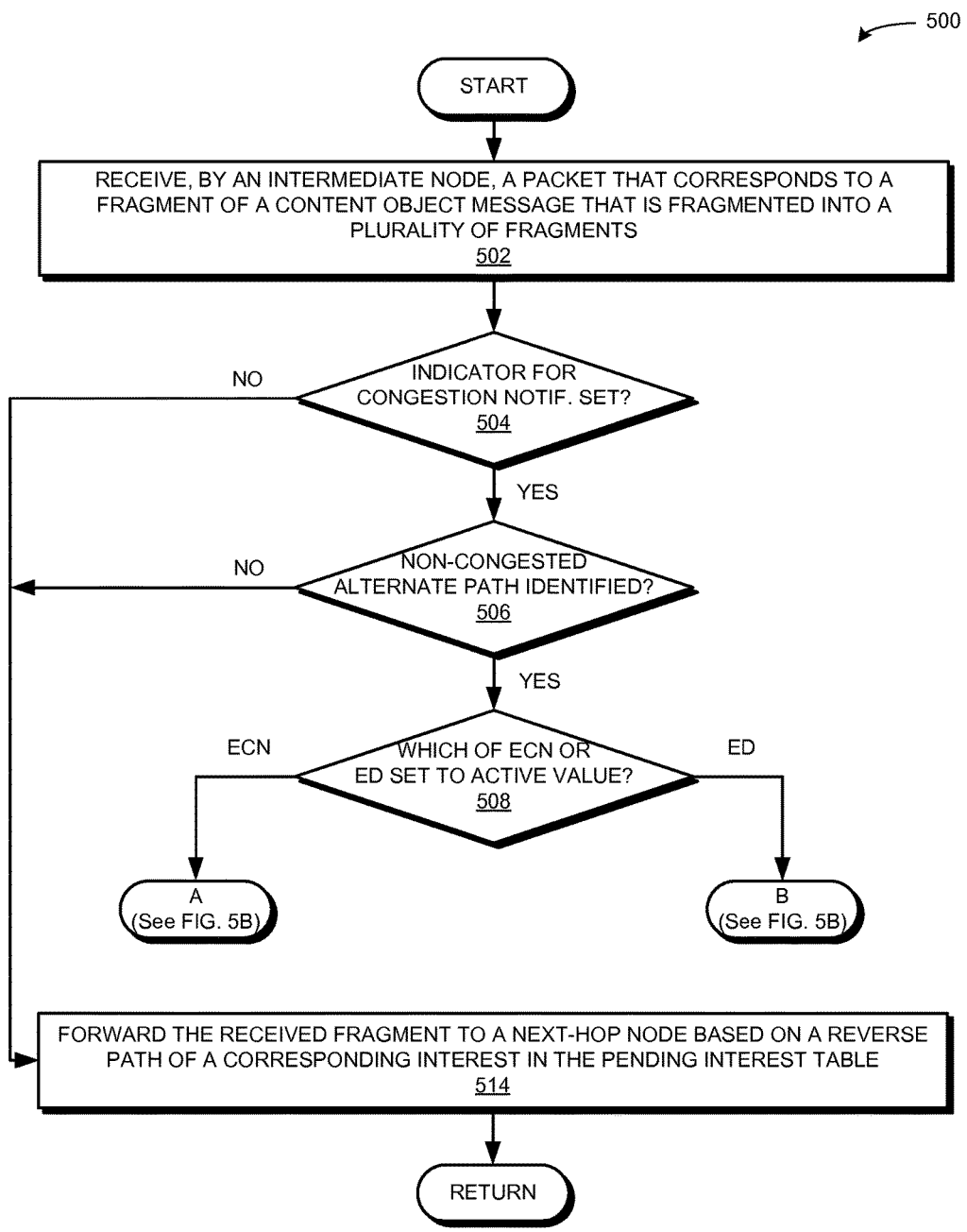
FIG. 5A presents a flow chart illustrating a method by an intermediate node for processing a fragment of a content object message, where the fragment indicates congestion and an alternate non-congested path is identified, in accordance with an embodiment of the present invention.

FIG. 5A presents a flow chart 500 illustrating a method by an intermediate node for processing a fragment of a content object message, where the fragment indicates congestion and an alternate non-congested path is identified, in accordance with an embodiment of the present invention. During operation, an intermediate node receives a packet that corresponds to a fragment of a content object message fragmented into a plurality of fragments (operation 502). The plurality of fragments includes at least one named fragment. The intermediate node determines whether an indicator for congestion notification is set (operation 504). For example, the intermediate node determines whether either of the ECN or ED flags is set to an active value. If the indicator for CN is not set, the intermediate node forwards the received fragment to a next-hop node based on a reverse path of a corresponding interest in the PIT (operation 514). If the indicator for CN is set (e.g., either of the ECN or ED flags is set), the intermediate node determines whether it can identify a non-congested alternate path (e.g., an alternate path not associated with the congestion) (operation 506). If it cannot, the intermediate node performs operation 514 as described above. If it can identify a non-congested alternate path, the intermediate node determines which of the ECN or ED flags is set to an active value (decision 508). If the ECN flag is set, the operation continues at Label A of FIG. 5B, and if the ED flag is set, the operation continues at Label B of FIG. 5C.

Figure 5B:
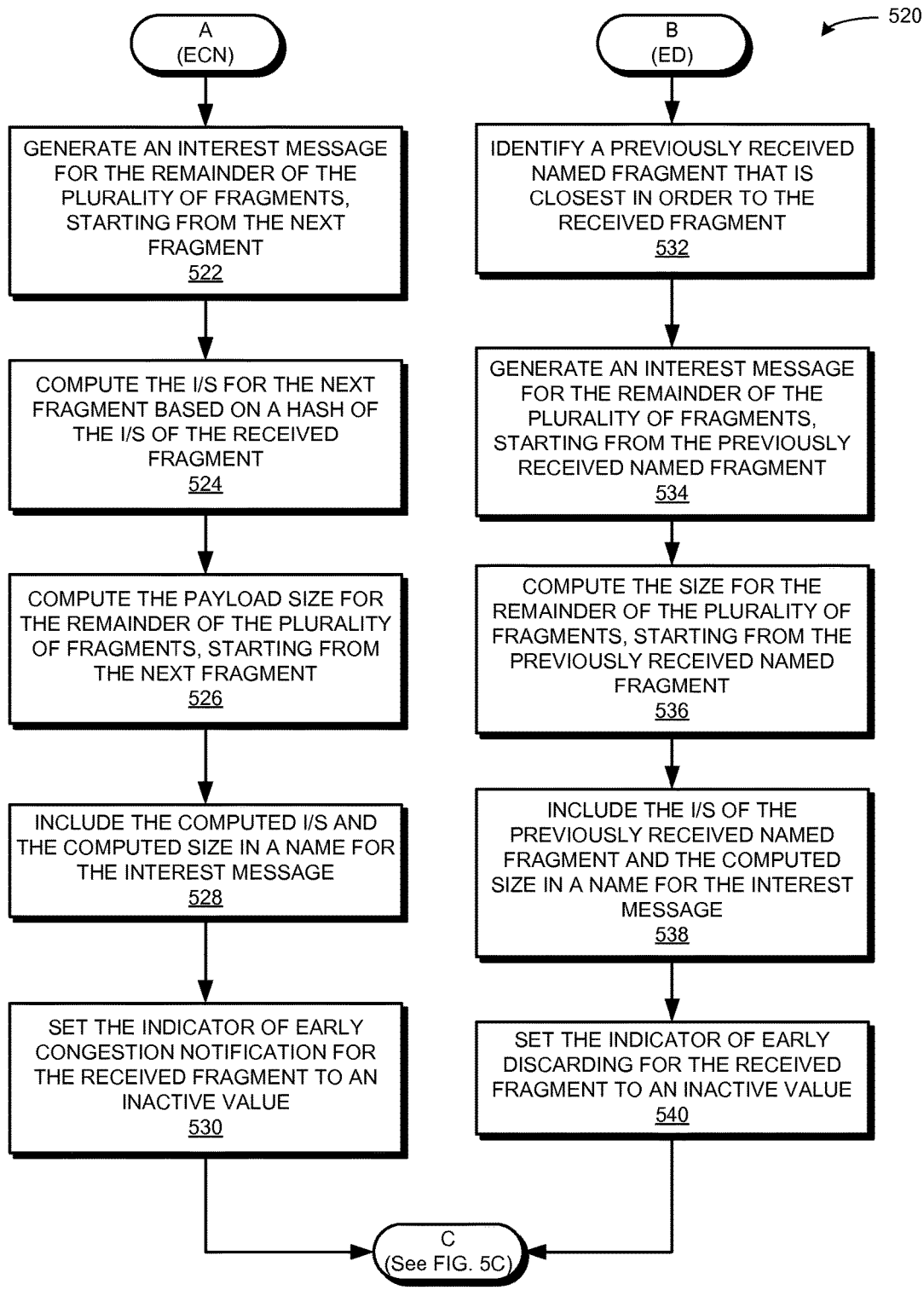
FIG. 5B presents a flow chart illustrating a method by an intermediate node for processing a fragment of a content object message, where the fragment indicates congestion and an alternate non-congested path is identified, in accordance with an embodiment of the present invention.

FIG. 5B presents a flow chart 520 illustrating a method by an intermediate node for processing a fragment of a content object message, where the fragment indicates congestion and an alternate non-congested path is identified, in accordance with an embodiment of the present invention. During operation, at Label A, when the intermediate node detects that the ECN flag is set, and a non-congested alternate path is available, the intermediate node generates an interest message for the remainder of the plurality of fragments, starting from the next fragment (operation 522). The next fragment is the fragment which directly follows the received fragment. The intermediate node computes the intermediate state for the next fragment based on a hash function performed on the intermediate state of the received fragment (operation 524). The intermediate node also computes the payload size for the remainder of the plurality of fragments, starting from the next fragment (operation 526). This can be based on, e.g., determining from a PIT lookup the overall length of the content object message in combination with the total number of bytes forwarded for the corresponding entry. The intermediate node includes the computed intermediate state and the computed payload size in a name for the interest message (operation 528). The intermediate node also sets the indicator of early congestion notification for the received fragment to an active value (operation 530), and the operation continues at Label C of FIG. 5C.

At Label B, when the intermediate node detects that the ED flag is set, and a non-congested alternate path is available, the intermediate node identifies a previously received named fragment that is closest in order to the received fragment (operation 532). The intermediate node generates an interest message for a remainder of the plurality of fragments, starting from the previously received name fragment (operation 534). The intermediate node computes the size for the remainder of the plurality of fragments, starting from the previously received named fragment (operation 536). This can be based on, e.g., identifying the payload offset of the received fragment and the overall length of the content object message from a corresponding PIT entry. The intermediate node includes the intermediate state of the previously received name fragment and the computed payload size in a name for the interest message (operation 538). The intermediate node also sets the indicator of early discarding for the received fragment to an inactive value (operation 540), and the operation continues at Label C of FIG. 5C.

Figure 5C:
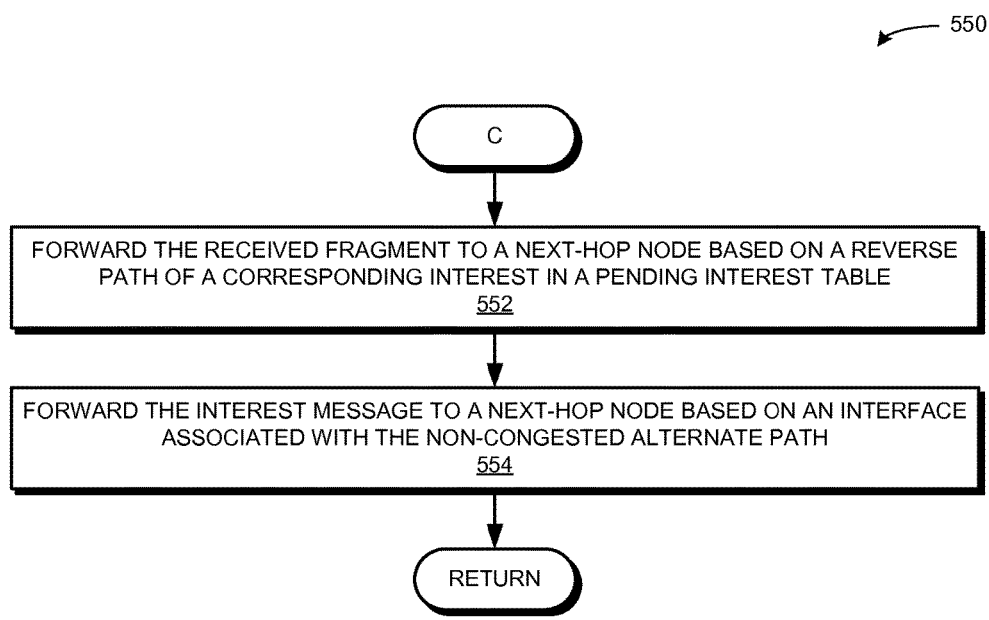
FIG. 5C presents a flow chart illustrating a method by an intermediate node for processing a fragment of a content object message, where the fragment indicates congestion and an alternate non-congested path is identified, in accordance with an embodiment of the present invention.

FIG. 5C presents a flow chart 550 illustrating a method by an intermediate node for processing a fragment of a content object message, where the fragment indicates congestion and an alternate non-congested path is identified, in accordance with an embodiment of the present invention. During operation, at Label C, the intermediate node forwards the received fragment to a next-hop node based on a reverse path of a corresponding interest in the PIT (operation 552). The intermediate node also forwards the interest message (with the appropriately constructed name, as shown in FIG. 5B) to a next-hop node based on an interface associated with the non-congested alternate path (operation 554). In this way, an upstream intermediate node that detects either the ECN or ED flag set to an active value can proactively begin requesting the remainder of the fragment stream on behalf of the client from a different, non-congested downstream path (e.g., the alternate path), and can also clear the appropriate bit or flag (as in operations 530 and 538).

Processing by a Content Requestor

Figure 6A:
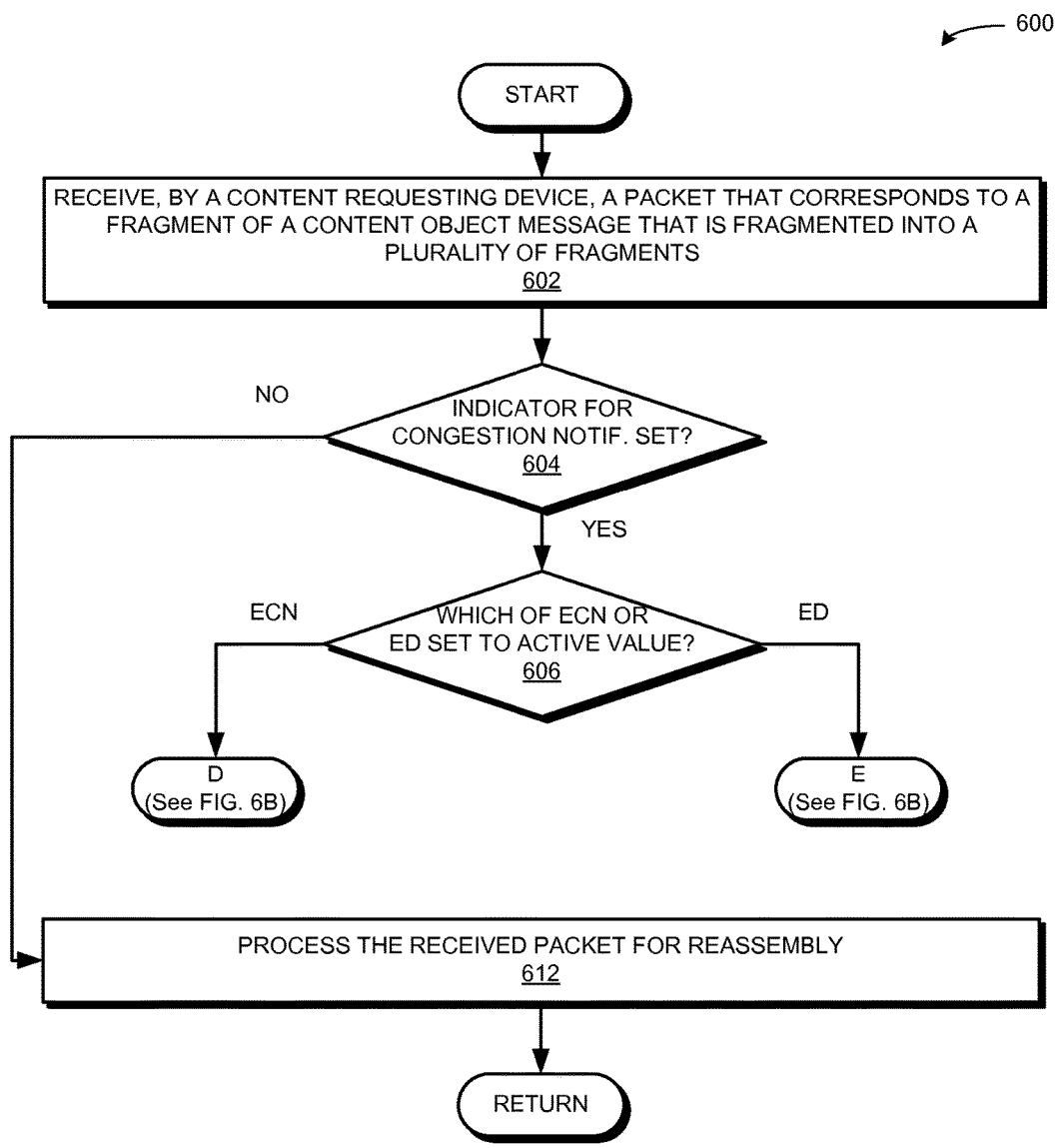
FIG. 6A presents a flow chart illustrating a method by a content requesting device for processing a fragment of a content object message, in accordance with an embodiment of the present invention.

FIG. 6A presents a flow chart 600 illustrating a method by a content requesting device for processing a fragment of a content object message, in accordance with an embodiment of the present invention. During operation, a content requesting device or a content requestor receives a packet that corresponds to a fragment of a content object message fragmented into a plurality of fragments (operation 602). The plurality of fragments includes at least one named fragment. The requestor determines whether an indicator for congestion notification is set (operation 604). For example, the requestor determines whether either of the ECN or ED flags is set to an active value. If the indicator for congestion notification is not set (e.g., neither of the ECN or ED flags is set), the requestor processes the received fragment for reassembly (operation 612). If the indicator for congestion notification is set (e.g., either of the ECN or ED flags is set), the requestor determines which of the ECN or ED flags is set to an active value (decision 606). If the ECN flag is set, the operation continues at Label D of FIG. 6B, and if the ED flag is set, the operation continues at Label E of FIG. 6B.

Figure 6B:
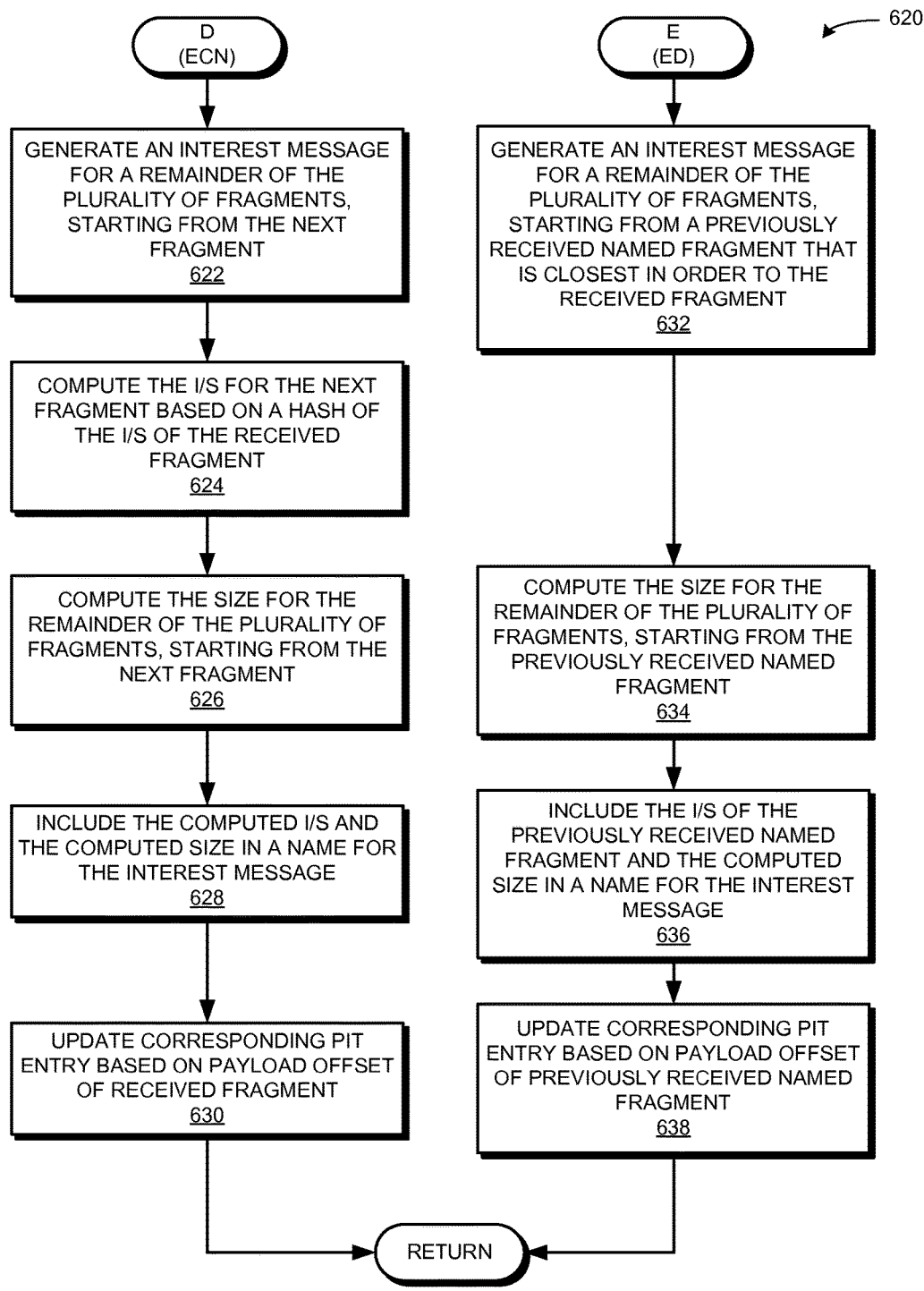
FIG. 6B presents a flow chart illustrating a method by a content requesting device for processing a fragment of a content object message, in accordance with an embodiment of the present invention.

FIG. 6B presents a flow chart 620 illustrating a method by a content requesting device for processing a fragment of a content object message, in accordance with an embodiment of the present invention. During operation, at Label D, when the content requesting device or the content requestor determines that the ECN flag is set, the requestor performs operations 622, 624, 626, and 628, which correspond respectively to operations 522, 524, 526, and 528 performed by an intermediate node, as described above in relation to FIG. 5B. The requestor also updates the corresponding PIT entry based on the payload offset of the received fragment (operation 630), which allows the requestor to continue monitoring which fragments have already been received. At Label E, when the requestor determines that the ED flag is set, the requestor performs operations 632, 634, and 636, which correspond respectively to operations 534, 536, and 538 performed by an intermediate node, as described above in relation to FIG. 5B. The requestor also updates the corresponding PIT entry based on the payload offset of the previously received name fragment (operation 638).

Exemplary Apparatus and Computer System

Figure 7A:
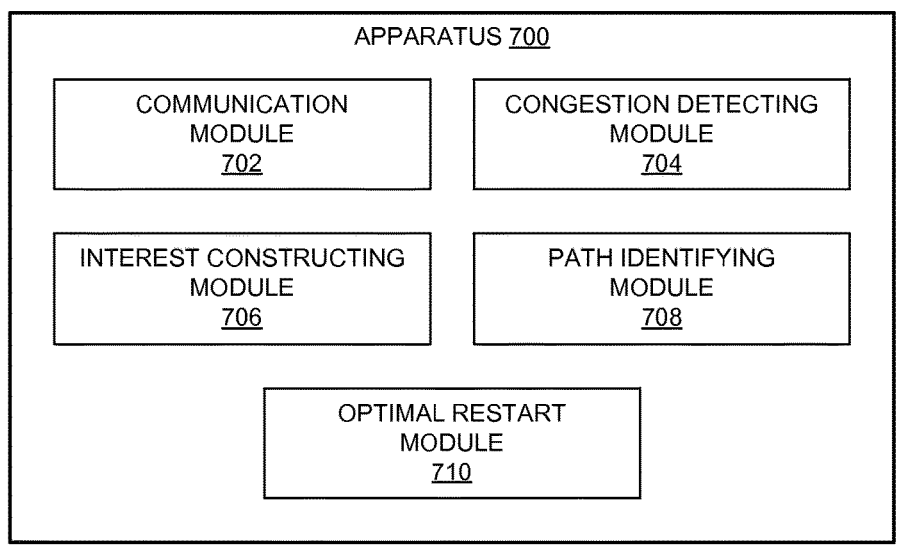
FIG. 7A illustrates an exemplary apparatus that facilitates flow control based on a secure fragmentation protocol, in accordance with an embodiment of the present invention.

FIG. 7A illustrates an exemplary apparatus 700 that facilitates flow control based on a secure fragmentation protocol, in accordance with an embodiment of the present invention. Apparatus 700 can comprise a plurality of modules which may communicate with one another via a wired or wireless communication channel. Apparatus 700 may be realized using one or more integrated circuits, and may include fewer or more modules than those shown in FIG. 7A. Further, apparatus 700 may be integrated in a computer system, or realized as a separate device which is capable of communicating with other computer systems and/or devices. Specifically, apparatus 700 can comprise a communication module 702, a congestion detecting module 704, an interest constructing module 706, a path identifying module 708, and an optimal restart module 710.

In some embodiments, communication module 702 can send and/or receive data packets to/from other network nodes across a computer network, such as a content centric network, where a data packet can correspond to a fragment of a content object message that is fragmented into a plurality of fragments. For example, communication module 702 can receive, by an intermediate node, a fragment of a content object. Congestion detecting module 704 can detect a congestion and set an indicator for congestion notification in a received fragment. Communication module 702 can forward the received fragment and also drop any fragments received after the forwarded fragment, e.g., for the same stream. Optimal restart module 710 can determine that the received fragment indicates an optimal position to restart a flow of the plurality of fragments, and can also determine that the received fragment is a previous fragment that directly precedes a named fragment. Optimal restart module 710 can further determine that the received fragment does not indicate an optimal position to restart a flow of the plurality of fragments.

Path identifying module 708 can identify an alternate path not associated with the congestion. Optimal restart module 710 can identify a previously received named fragment that is closest in order to the received fragment. Interest constructing module 706 can generate an interest for a remainder of the plurality of fragments starting from a next fragment that directly follows a received fragment or the previously received named fragment. Interest constructing module 706 can also compute an intermediate state for the next fragment, determine a payload size for the remainder of the plurality of fragments starting from the next fragment or the previously received named fragment, and include in a name for the interest the computed intermediate state (or an intermediate state of the previously received named fragment) and the determined payload size. Congestion detecting module 704 can reset an indicator for early congestion notification or for early discarding. Communication module 702 can forward the interest based on an interface associated with the alternate path.

Figure 7B:
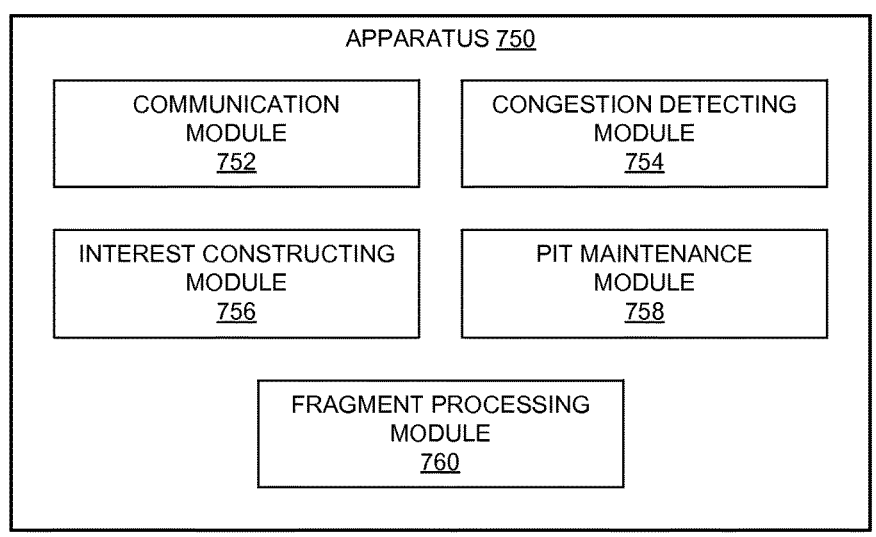
FIG. 7B illustrates an exemplary apparatus that facilitates flow control based on a secure fragmentation protocol, in accordance with an embodiment of the present invention.

FIG. 7B illustrates an exemplary apparatus 750 that facilitates flow control based on a secure fragmentation protocol, in accordance with an embodiment of the present invention. Apparatus 750 can comprise a plurality of modules which may communicate with one another via a wired or wireless communication channel. Apparatus 750 may be realized using one or more integrated circuits, and may include fewer or more modules than those shown in FIG. 7B. Further, apparatus 750 may be integrated in a computer system, or realized as a separate device which is capable of communicating with other computer systems and/or devices. Specifically, apparatus 750 can comprise a communication module 752, a congestion detecting module 754, an interest constructing module 756, a PIT maintenance module 758, and a fragment processing module 760.

In some embodiments, communication module 752 can send and/or receive data packets to/from other network nodes across a computer network, such as a content centric network, where a data packet can correspond to a fragment of a content object message that is fragmented into a plurality of fragments. For example, communication module 752 can receive, by a content requesting device, a fragment of a content object. Congestion detecting module 754 can determine that an indicator for congestion notification in the received fragment is set. Interest constructing module 756 can generate an interest for a remainder of the plurality of fragments starting from a named fragment.

Interest constructing module 756 can generate an interest for a remainder of the plurality of fragments starting from a next fragment that directly follows a received fragment or identify a previously received named fragment that is closest in order to the received fragment. Interest constructing module 756 can also compute an intermediate state for the next fragment, determine a payload size for the remainder of the plurality of fragments starting from the next fragment or the previously received named fragment, and include in a name for the interest the computed intermediate state (or an intermediate state of the previously received named fragment) and the determined payload size. PIT maintenance module 758 can update a corresponding entry in a PIT based on a payload offset of the received fragment or the previously received named fragment. Fragment processing module 760 can process the received fragment for reassembly.

Figure 8A:
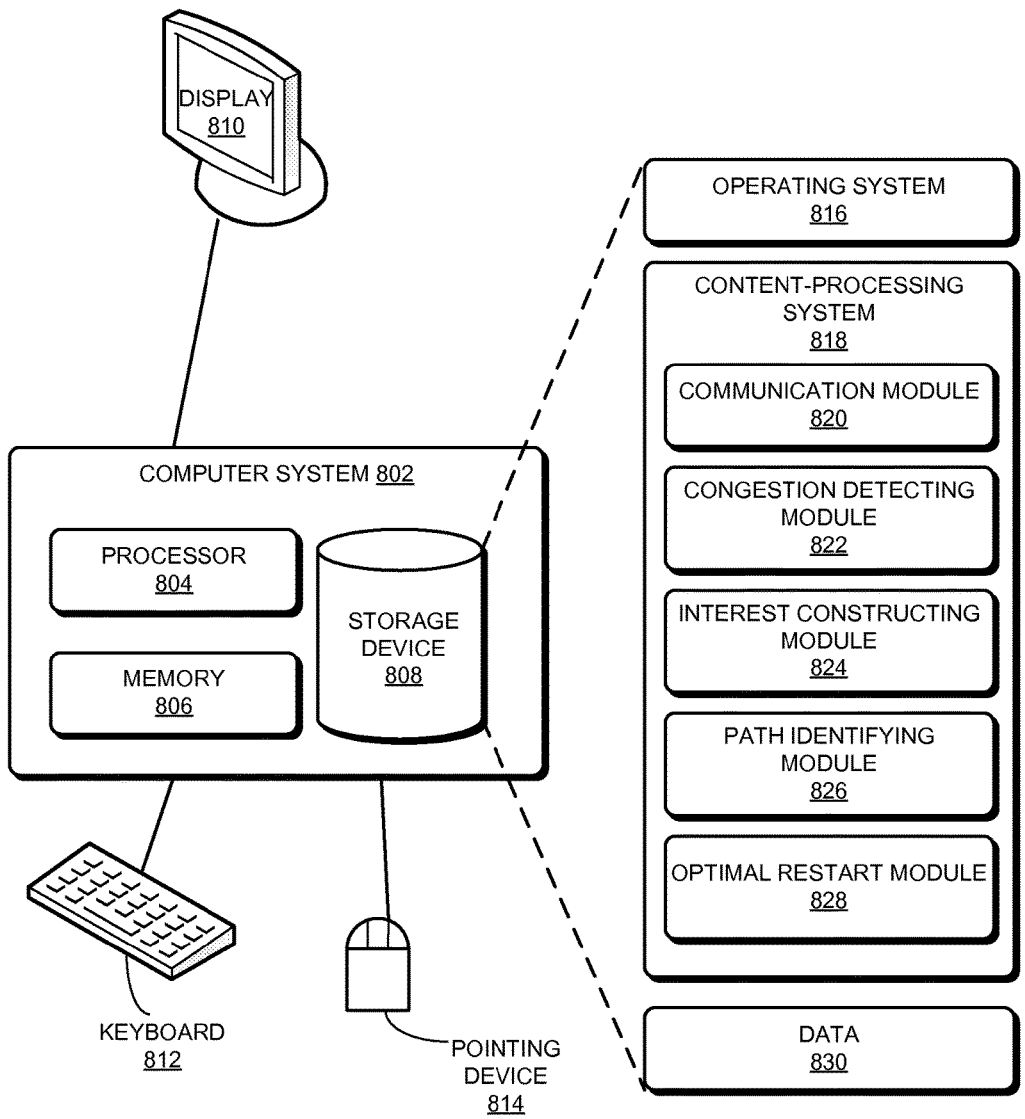
FIG. 8A illustrates an exemplary computer system that facilitates flow control based on a secure fragmentation protocol, in accordance with an embodiment of the present invention.

FIG. 8A illustrates an exemplary computer system 802 that facilitates flow control based on a secure fragmentation protocol, in accordance with an embodiment of the present invention. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 830.

Content-processing system 818 can include instructions, which when executed by computer system 802, can cause computer system 802 to perform methods and/or processes described in this disclosure. Specifically, content-processing system 818 may include instructions for sending and/or receiving data packets to/from other network nodes across a computer network, such as a content centric network (communication module 820). For example, content-processing system 818 can include instructions for receiving, by an intermediate node, a data packet that corresponds to a fragment of a content object message that is fragmented into a plurality of fragments (communication module 820).

Content-processing system 818 can include instructions for detecting a congestion and setting an indicator for congestion notification in a received fragment (congestion detecting module 822). Content-processing system 818 can also include instructions for forwarding the received fragment and for dropping any fragments received after the forwarded fragment, e.g., for the same stream (communication module 820). Content-processing system 818 can additionally include instructions for determining whether the received fragment indicates an optimal position to restart a flow of the plurality of fragments, and also for determining that the received fragment is a previous fragment that directly precedes a named fragment (optimal restart module 828).

Content-processing system 818 can further include instructions for identifying an alternate path not associated with the congestion (path identifying module 826). Content-processing system 818 can include instructions for identifying a previously received named fragment that is closest in order to the received fragment (optimal restart module 828). Content-processing system 818 can include instructions for generating an interest for a remainder of the plurality of fragments starting from a next fragment that directly follows a received fragment or the previously received named fragment (interest constructing module 824). Content-processing system 818 can also include instructions for computing an intermediate state for the next fragment, determining a payload size for the remainder of the plurality of fragments starting from the next fragment or the previously received named fragment, and including in a name for the interest the computed intermediate state (or an intermediate state of the previously received named fragment) and the determined payload size (interest constructing module 824).

Content-processing system 818 can include instructions for resetting an indicator for early congestion notification or for early discarding (congestion detecting module 822). Content-processing system 818 can include instructions for forwarding the interest based on an interface associated with the alternate path (communication module 820).

Figure 8B:
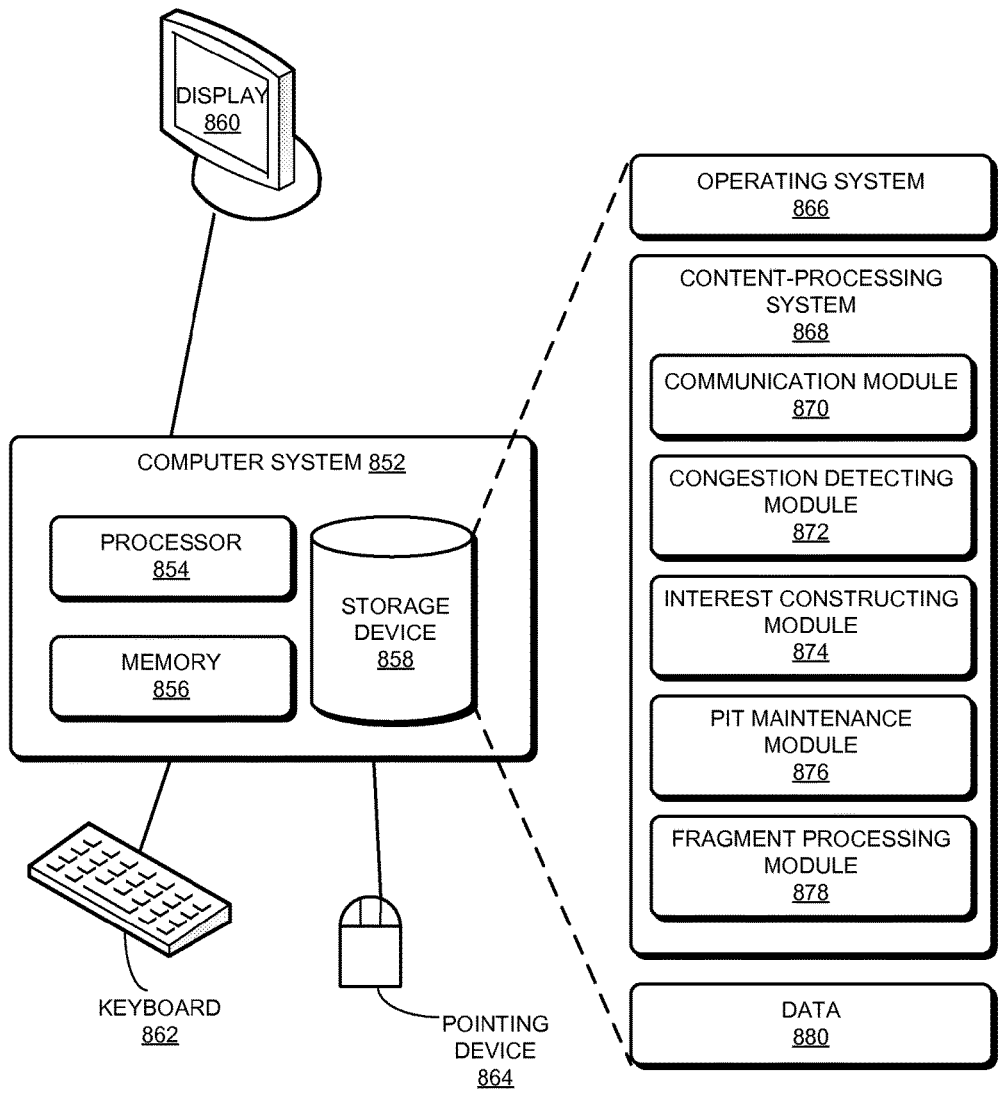
FIG. 8B illustrates an exemplary computer system that facilitates flow control based on a secure fragmentation protocol, in accordance with an embodiment of the present invention.

FIG. 8B illustrates an exemplary computer system 852 that facilitates flow control based on a secure fragmentation protocol, in accordance with an embodiment of the present invention. Computer system 852 includes a processor 854, a memory 856, and a storage device 858. Memory 856 can include a volatile memory (e.g., RAM) that serves as a managed memory, and can be used to store one or more memory pools. Furthermore, computer system 852 can be coupled to a display device 860, a keyboard 862, and a pointing device 864. Storage device 858 can store an operating system 866, a content-processing system 868, and data 880.

Content-processing system 868 can include instructions, which when executed by computer system 852, can cause computer system 852 to perform methods and/or processes described in this disclosure. Specifically, content-processing system 868 may include instructions for sending and/or receiving data packets to/from other network nodes across a computer network, such as a content centric network (communication module 870). For example, content-processing system 818 can include instructions for receiving, by a content requesting device, a data packet that corresponds to a fragment of a content object message that is fragmented into a plurality of fragments (communication module 870).

Content-processing system 868 can include instructions for determining that an indicator for congestion notification in the received fragment is set (congestion detecting module 872). Content-processing system 868 can include instructions for generating an interest for a remainder of the plurality of fragments starting from a named fragment (interest constructing module 874).

Content-processing system 868 can include instructions for generating an interest for a remainder of the plurality of fragments starting from a next fragment that directly follows a received fragment or the previously received named fragment (interest constructing module 874). Content-processing system 868 can also include instructions for computing an intermediate state for the next fragment, determining a payload size for the remainder of the plurality of fragments starting from the next fragment or the previously received named fragment, and including in a name for the interest the computed intermediate state (or an intermediate state of the previously received named fragment) and the determined payload size (interest constructing module 874).

Content-processing system 868 can also include instructions for updating a corresponding entry in a PIT based on a payload offset of the received fragment or the previously received named fragment (PIT maintenance module 876). Content-processing system 868 can also include instructions for processing the received fragment for reassembly (fragment processing module 878).

Data 830 of FIG. 8A and data 880 of FIG. 8B can include any data that is required as input or that is generated as output by the methods and/or processes described in this disclosure. Specifically, data 830 and data 880 can store at least: a packet that corresponds to a fragment of a content object message that is fragmented into a plurality of fragments; a unique name that is an HSVLI that comprises contiguous name components ordered from a most general level to a most specific level; a name that is based on a hash of a content object or that indicates a digest; an intermediate state for a fragment which is based on a hash function performed on an intermediate state from a previous fragment and data included in the fragment; a pending interest table; a digest for a content object; a byte offset that corresponds to a starting byte for a fragment; an overall length for a content object; a payload size; an entry in a pending interest table; a digital signature of a content producing device; a total number of bytes forwarded; a name that indicates the intermediate state, the byte offset, the digest, and/or the payload size; an indicator of congestion notification; an indicator of early congestion notification; an indicator of early discarding; an indicator that a next fragment is a named fragment; and an interest for a subsequence of a fragment stream.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating forwarding of packets, the system comprising
   a processor; and
   a storage device storing instructions that when executed by the processor cause the processor to perform a method, the method comprising:
   receiving, by an intermediate node, a first fragment which is a fragment of a content object that is fragmented into a plurality of fragments,
   wherein the plurality of fragments includes at least one named fragment, which indicates a name associated with the content object, the name being a hierarchically structured variable-length identifier that comprises contiguous name components ordered from a most general level to a most specific level;
   detecting a congestion;
   when there is congestion:
      setting an indicator for congestion notification in the received first fragment;
      forwarding the received first fragment;
      dropping a second fragment received after the forwarded first fragment;
   receiving a third fragment comprising a congestion notification;
   identifying an alternate path not associated with the congestion;
   generating an interest for a remainder of the plurality of fragments based on the congestion notification of the third fragment; and
   forwarding the interest based on an interface associated with the alternate path.

2. The computer system of claim 1, wherein in response to detecting the congestion, the method further comprises:
   determining that the received first fragment indicates an optimal position to restart a flow of the fragment,
   wherein the indicator for congestion notification is an indicator for early congestion notification.

3. The computer system of claim 1, wherein the method further comprises:
   determining that the received first fragment indicates an optimal position to restart a flow of the fragment, which involves: determining that the received first fragment is a previous fragment that directly precedes a named fragment.

4. The computer system of claim 1, wherein the method further comprises:
   determining that the received first fragment does not indicate an optimal position to restart a flow of the fragment,
   wherein the indicator for congestion notification is an indicator for early discarding.

5. The computer system of claim 1, wherein the congestion notification in the received third fragment is an indicator for early congestion, and wherein the method further comprises:
   generating the interest further comprises, generating the interest for the remainder of the plurality of fragments starting from a next fragment that directly follows the received third fragment; and
   setting the indicator for early congestion notification in the received third fragment to an inactive value.

6. The computer system of claim 5, wherein generating the interest further comprises:
   computing an intermediate state for the next fragment based on a hash function performed on an intermediate state from the received third fragment, wherein the received third fragment indicates an intermediate state which is based on a hash function performed on an intermediate state from a previous fragment and data included in the received third fragment;
   determining a payload size for the remainder of the plurality of fragments starting from the next fragment; and
   including in a name for the interest based on the computed intermediate state and the determined payload size.

7. The computer system of claim 1, wherein the congestion notification in the received third fragment is an indicator for early discarding, and wherein the method further comprises:
   identifying a previously received named fragment that is closest in order to the received third fragment;
   generating the interest further comprises, generating the interest for the remainder of the plurality of fragments starting from the previously received named fragment; and
   setting the indicator for early discarding in the received third fragment to an inactive value.

8. The computer system of claim 7, wherein generating the interest further comprises:
   determining a payload size for the remainder of the plurality of fragments starting from the previously received named fragment; and
   including in a name for the interest an intermediate state for the previously received named fragment and the determined payload size.

wherein the intermediate state for the previously received named fragment is based on a hash function performed on an intermediate state from a previous fragment that directly precedes the previously received named fragment and data included in the previously received named fragment.

9. The computer system of claim 1, wherein a name for an interest includes a digest for the content object, and a number indicating a byte offset that corresponds to a starting byte for the received first fragment or a previously received named fragment closest in order to the received first fragment.

10. A computer system for facilitating forwarding of packets, the system comprising:
a processor; and
a storage device storing instructions that when executed by the processor cause the processor to perform a method, the method comprising:
receiving, by a content requesting device, a first fragment which is a fragment of a content object message that is fragmented into a plurality of fragments, wherein the plurality of fragments includes at least one named fragment, which indicates a name associated with the content object, the name being a hierarchically structured variable-length identifier that comprises contiguous name components ordered from a most general level to a most specific level;
determining that an indicator for congestion notification in the received first fragment is set;
updating a corresponding entry in a pending interest table based on a payload offset of the received first fragment or of a previously received named fragment that is closest in order to the received first fragment, wherein the payload offset is a number indicating a byte offset; and
generating an interest for a remainder of the plurality of fragments starting from a named fragment.

11. The computer system of claim 10, wherein the indicator for congestion notification is an indicator for early congestion notification, wherein the named fragment is a next fragment that directly follows the received first fragment, and wherein generating the interest further comprises:
computing an intermediate state for the next fragment based on a hash function performed on an intermediate state from the received first fragment, wherein the received first fragment indicates an intermediate state which is based on a hash function performed on an intermediate state from a previous fragment and data included in the received first fragment;
determining a payload size for the remainder of the plurality of fragments starting from the next fragment; and
including in a name for the interest based on the computed intermediate state and the determined payload size.

12. The computer system of claim 10, wherein the byte offset corresponds to a starting byte for the received first fragment.

13. The computer system of claim 10, wherein the indicator for congestion notification is an indicator for early discarding, wherein the named fragment is the previously received named fragment that is closest in order to the received first fragment, and wherein generating the interest further comprises:
determining a payload size for the remainder of the plurality of fragments starting from the previously received named fragment; and
including in a name for the interest an intermediate state for the previously received named fragment and the determined payload size,
wherein the intermediate state for the previously received named fragment is based on a hash function performed on an intermediate state from a previous fragment that directly precedes the previously received named fragment and data included in the previously received named fragment.

14. The computer system of claim 13, wherein the byte offset corresponds to a starting byte for the previously received named fragment.

15. The computer system of claim 10, wherein the method further comprises:
in response to determining that the indicator for congestion notification in the received first fragment is not set, processing the received first fragment for reassembly.

16. A computer-implemented method for forwarding packets, the method comprising:
receiving, by an intermediate node, a first fragment which is a fragment of a content object that is fragmented into a plurality of fragments,
wherein the plurality of fragments includes at least one named fragment, which indicates a name associated with the content object, the name being a hierarchically structured variable-length identifier that comprises contiguous name components ordered from a most general level to a most specific level;
detecting a congestion;
when there is congestion:
setting an indicator for congestion notification in the received first fragment;
forwarding the received first fragment;
dropping a second fragment received after the forwarded first fragment;
receiving a third fragment comprising a congestion notification;
identifying an alternate path not associated with the congestion;
generating an interest for a remainder of the plurality of fragments based on the congestion notification of the third fragment; and
forwarding the interest based on an interface associated with the alternate path.

17. The method of claim 16, wherein in response to detecting the congestion, the method further comprises:
determining that the received first fragment indicates an optimal position to restart a flow of the fragment,
wherein the indicator for congestion notification is an indicator for early congestion notification.

18. The method of claim 16, further comprising:
determining that the received first fragment indicates an optimal position to restart a flow of the fragment, which involves:
determining that the received first fragment is a previous fragment that directly precedes a named fragment.

19. The method of claim 16, further comprising:
determining that the received first fragment does not indicate an optimal position to restart a flow of the fragment,
wherein the indicator for congestion notification is an indicator for early discarding.

20. The method of claim 16, further comprising wherein the congestion notification in the received third fragment is an indicator for early congestion, the method further comprising:

generating the interest further comprising, generating the interest for the remainder of the plurality of fragments starting from a next fragment that directly follows the third fragment; and setting the indicator for early congestion notification in the received third fragment to an inactive value.

21. The method of claim 20, wherein generating the interest further comprises:

computing an intermediate state for the next fragment based on a hash function performed on an intermediate state from the received first fragment, wherein the received first fragment indicates an intermediate state which is based on a hash function performed on an intermediate state from a previous fragment and data included in the received first fragment;

determining a payload size for the remainder of the plurality of fragments starting from the next fragment; and including in a name for the interest the computed intermediate state and the determined payload size.

22. The method of claim 16, wherein the congestion notification in the received third fragment is an indicator for early discarding, the method further comprising:

identifying a previously received named fragment that is closest in order to the received third fragment;

generating the interest further comprising, generating the interest for the remainder of the plurality of fragments starting from the previously received named fragment; and setting the indicator for early discarding in the received third fragment to an inactive value.

23. The method of claim 22, wherein generating the interest further comprises:

determining a payload size for the remainder of the plurality of fragments starting from the previously received named fragment; and including in a name for the interest an intermediate state for the previously received named fragment and the determined payload size, wherein the intermediate state for the previously received named fragment is based on a hash function performed on an intermediate state from a previous fragment that directly precedes the previously received named fragment and data included in the previously received named fragment.

24. The method of claim 16, wherein a name for an interest includes a digest for the content object, and a number indicating a byte offset that corresponds to a starting byte for the received first fragment or a previously received named fragment closest in order to the received first fragment.

* * * * *

UNITED STATES PATENT AND TRADEMARK OFFICE
CERTIFICATE OF CORRECTION

PATENT NO. : 10,355,999 B2
APPLICATION NO. : 14/863307
DATED : July 16, 2019
INVENTOR(S) : Marc E. Mosko et al.

Page 1 of 1

It is certified that error appears in the above-identified patent and that said Letters Patent is hereby corrected as shown below:

In the Claims

Claim 9, Column 19, Line 9, please replace "offsetthat" with --offset that--

Claim 15, Column 20, Line 17, please replace "forreassembly." with --for reassembly.--

Claim 20, Column 20, Line 64, please remove "further comprising"

Signed and Sealed this
Tenth Day of September, 2019

Andrei Iancu
*Director of the United States Patent and Trademark Office*